US012491449B1

(12) United States Patent
Huang

(10) Patent No.: US 12,491,449 B1
(45) Date of Patent: Dec. 9, 2025

(54) BUILDING BLOCK

(71) Applicant: Shenzhen BLACK TECH Co., Ltd., Shenzhen (CN)

(72) Inventor: Lianwu Huang, Shenzhen (CN)

(73) Assignee: SHENZHEN BLACK TECH CO., LTD., Shenzhen (CN)

( * ) Notice: Subject to any disclaimer, the term of this patent is extended or adjusted under 35 U.S.C. 154(b) by 0 days.

(21) Appl. No.: 18/946,237

(22) Filed: Nov. 13, 2024

(30) Foreign Application Priority Data

Nov. 4, 2024 (CN) ......................... 202422672490.1

(51) Int. Cl.

| | |
|---|---|
| ***A63H 33/04*** | (2006.01) |
| ***F21L 4/00*** | (2006.01) |
| ***F21V 19/00*** | (2006.01) |
| ***F21V 23/04*** | (2006.01) |
| ***F21V 33/00*** | (2006.01) |

(52) U.S. Cl.

CPC ......... *A63H 33/046* (2013.01); *A63H 33/042* (2013.01); *F21L 4/00* (2013.01); *F21V 19/0015* (2013.01); *F21V 23/04* (2013.01); *F21V 33/008* (2013.01)

(58) Field of Classification Search

CPC ............................ A63H 33/046; A63H 33/042

See application file for complete search history.

(56) References Cited

U.S. PATENT DOCUMENTS

| | | | | | |
|---|---|---|---|---|---|
| 2,416,959 A | * | 3/1947 | Herzl | A63F 9/08 | 273/153 R |
| 2,497,744 A | * | 2/1950 | Morris | A63H 33/30 | 446/474 |
| 3,225,460 A | * | 12/1965 | Randell | A63F 9/24 | 446/485 |
| 3,237,341 A | * | 3/1966 | Janning | F21S 9/02 | 273/238 |
| 3,576,936 A | * | 5/1971 | Fischer | A63H 33/042 | D13/184 |
| 3,596,078 A | * | 7/1971 | Owens | F42B 8/26 | 362/186 |
| 3,629,680 A | * | 12/1971 | Baynes | A63H 29/24 | 320/109 |
| 3,632,936 A | * | 1/1972 | Piber | H01H 9/063 | 200/293.1 |
| 3,696,548 A | * | 10/1972 | Teller | A63H 33/042 | 446/91 |
| 3,877,171 A | * | 4/1975 | Sloop | F21L 4/005 | 362/310 |

(Continued)

*Primary Examiner* — Eugene L Kim
*Assistant Examiner* — Matthew B Stanczak

(57) ABSTRACT

A building block includes a building block main body and an installation housing. The building block main body is formed by a plurality of sidewalls connected to each other, the plurality of sidewalls include a first surrounding wall group, an upper sidewall and a lower sidewall connected in sequence, an upper side of the first surrounding wall group is connected to the upper sidewall, a lower side of the first surrounding wall group is connected to the lower sidewall, and a first chamber is formed by jointly surrounding the first surrounding wall group, the upper sidewall and the lower sidewall. The installation housing is connected to the upper sidewall and is positioned in the first chamber, and the installation housing is equipped with a light-emitting assembly.

13 Claims, 11 Drawing Sheets

(56) References Cited

U.S. PATENT DOCUMENTS 3,878,521 A * 4/1975 Licitis .................... A63H 30/04
446/454
3,977,758 A * 8/1976 Mabuchi ................ H02K 5/225
439/759
4,221,454 A * 9/1980 Wong ..................... A63H 29/22
439/500
4,242,831 A * 1/1981 O'Shaughnessy ..... A63H 30/02
446/457
4,334,384 A * 6/1982 Rogers ................... A63H 33/30
446/397
4,383,007 A * 5/1983 Murphy .............. H01M 50/213
429/96
4,882,942 A * 11/1989 Hamilton ................. G05G 1/08
74/494
5,058,894 A * 10/1991 Levinn .................. A63F 9/0612
273/153 R
5,186,652 A * 2/1993 Hai-Yung .............. H01R 13/66
439/500
5,374,806 A * 12/1994 Chou .................... B29C 66/836
219/229
5,434,761 A * 7/1995 Lesnick .................. F21V 23/04
446/485
5,607,322 A * 3/1997 Schaub ............... H01M 50/213
429/100
5,926,770 A * 7/1999 Nishiyama ............. G08B 5/225
455/566
6,024,626 A * 2/2000 Mendelsohn ........ A63H 33/046
446/124
6,271,453 B1 * 8/2001 Hacker ................ G09B 15/023
84/476
6,414,906 B1 * 7/2002 Gaspari ............... A01M 31/004
446/397
6,443,796 B1 * 9/2002 Shackelford ......... A63H 33/086
273/237
7,334,791 B2 * 2/2008 Lindsey ................ A63F 9/0468
273/146
7,846,002 B1 * 12/2010 Mikesell .............. A63H 33/042
446/92
8,517,789 B2 * 8/2013 Barber ................. A63H 33/042
446/128
8,764,507 B2 * 7/2014 Lin ...................... A63H 33/086
446/91
8,864,546 B1 * 10/2014 Capriola .............. A63H 33/042
446/124
10,047,940 B2 * 8/2018 Grunzweig ............... F21S 2/00
11,766,622 B1 * 9/2023 Chen .................... A63H 33/046
446/92
11,833,443 B2 * 12/2023 Yamaai .................. A63H 29/22
11,920,749 B2 * 3/2024 Poon (Pan) ............. F21V 23/06
12,151,182 B2 * 11/2024 Chen .................... A63H 33/046
12,350,603 B1 * 7/2025 Lu ........................... F21V 23/04
2003/0101526 A1 * 6/2003 Hilscher .............. A61C 17/221
15/22.1
2003/0148700 A1 * 8/2003 Arlinsky .................. G09B 1/40
446/91
2003/0214259 A9 * 11/2003 Dowling ................... F21K 9/00
315/312
2006/0134978 A1 * 6/2006 Rosen .................. H01R 13/514
439/581
2007/0010164 A1 * 1/2007 Kowalski ............. A63H 33/042
446/485
2007/0184722 A1 * 8/2007 Doherty ............... A63H 33/042
439/638
2012/0268924 A1 * 10/2012 Whang ................. A63F 9/0613
362/184
2013/0109267 A1 * 5/2013 Schweikardt ........ A63H 33/046
446/85
2013/0163235 A1 * 6/2013 Chuang ..................... F21L 4/00
362/367
2014/0349544 A1 * 11/2014 Chien .................. A63H 33/042
446/91
2015/0065007 A1 * 3/2015 Klepper ............... A63H 33/046
446/92
2015/0258462 A1 * 9/2015 Wei ........................ A63H 33/06
446/92
2016/0325200 A1 * 11/2016 Lu ........................ A63H 33/042
2017/0023219 A1 * 1/2017 Grunzweig .......... A63H 33/046
2017/0340980 A1 * 11/2017 Marcil ................... A63H 27/10
2018/0056205 A1 * 3/2018 Lu ............................. F21L 4/02
2018/0187842 A1 * 7/2018 Poon (Pan) ............... F21V 3/10
2023/0088274 A1 * 3/2023 Kirk .................... H01M 50/514
2023/0311019 A1 * 10/2023 McKay .................. G09B 5/062
446/147
2024/0238688 A1 * 7/2024 Chen .................... A63H 33/046
2024/0238689 A1 * 7/2024 Chen .................... A63H 33/046
2024/0246005 A1 * 7/2024 Wallington .............. G09B 5/02
2024/0261696 A1 * 8/2024 Jennings ................ A63H 33/06
2025/0041753 A1 * 2/2025 Chen .................... A63H 33/046
2025/0058243 A1 * 2/2025 Chen .................... A63H 33/046

* cited by examiner

BUILDING BLOCK

CROSS-REFERENCE TO RELATED APPLICATIONS

The application claims priority of Chinese patent application CN2024226724901, filed on Nov. 4, 2024, which is incorporated herein by reference in its entireties.

TECHNICAL FIELD

The present invention relates to the field of toys, in particular to a building block.

BACKGROUND

As a classic children's toy, building blocks can not only enhance children's creativity, logical thinking and hands-on ability, but also stimulate children's spatial awareness and problem-solving skills.

However, with the development of technology and people's dissatisfaction with the single design of traditional building blocks, traditional building blocks need to gradually incorporate more innovative elements to arouse children's interest in building block toys and enhance the fun and diversity of building block products.

SUMMARY

In order to overcome the deficiencies of the existing technology, the present invention provides a building block. A light-emitting assembly is arranged inside the building block to increase the fun and diversity of the building block product and enhance children's interest in building block toys.

The technical solution adopted by the present disclosure to solve the technical problem is as follows.

A building block, includes:

a building block main body, wherein the building block main body is formed by a plurality of sidewalls connected to each other, the plurality of sidewalls include a first surrounding wall group, an upper sidewall and a lower sidewall connected in sequence, an upper side of the first surrounding wall group is connected to the upper sidewall, a lower side of the first surrounding wall group is connected to the lower sidewall, and a first chamber is formed by jointly surrounding the first surrounding wall group, the upper sidewall and the lower sidewall;

an installation housing, wherein the installation housing is connected to the upper sidewall and is positioned in the first chamber, and the installation housing is equipped with a light-emitting assembly.

As an improvement of the present disclosure, the light-emitting assembly includes a battery assembly and a light-emitting element electrically connected to the battery assembly, and the battery assembly is configured to supply power to the light-emitting element.

As an improvement of the present disclosure, the building block further includes a switch assembly, the switch assembly is arranged on the building block main body and is electrically connected to the light-emitting assembly, and the switch assembly is configured to control turning on or turning off the light-emitting element.

As an improvement of the present disclosure, the installation housing is equipped with an installation chamber and a positioning clamping seat arranged on an outer wall of the installation housing, the battery assembly is positioned in the installation chamber, and the light-emitting element is clamped in the positioning clamping seat and is electrically connected to the battery assembly.

As an improvement of the present disclosure, the installation chamber is equipped with a first stop block group and a second stop block group, the first stop block group and the second stop block group are respectively positioned adjacent to two opposite ends of the installation chamber, a first clamping groove is formed by jointly surrounding the first stop block group and an inner wall of the installation chamber, a second clamping groove is formed by jointly surrounding the second stop block group and the inner wall of the installation chamber, a third clamping groove is formed by jointly surrounding the first stop block group, the second stop block group and the inner wall of the installation chamber, and the first clamping groove, the third clamping groove and the second clamping groove are connected in sequence; the battery assembly includes an anode conductive piece, a cathode conductive piece and a battery, the anode conductive piece is positioned in the first clamping groove, the cathode conductive piece is positioned in the second clamping groove, and the battery is positioned in the third clamping groove.

As an improvement of the present disclosure, a first through hole and a second through hole are arranged on a bottom wall of the installation housing, the first through hole is positioned in the first clamping groove, the second through hole is positioned in the second clamping groove, the anode conductive piece includes a first clamping end and a first connecting end, the cathode conductive piece includes a second clamping end and a second connecting end, when the first clamping end is clamped in the first clamping groove, the first connecting end is able to pass through the first through hole and extend out from the outer wall of the installation housing, and when the second clamping end is clamped in the second clamping groove, the second connecting end is able to pass through the second through hole and extend out from the outer wall of the installation housing.

As an improvement of the present disclosure, the positioning clamping seat is connected to the bottom wall of the installation housing, the positioning clamping seat is equipped with a positioning groove, a first connecting hole and a second connecting hole connected to the positioning groove respectively, the light-emitting element includes a lamp bead, an anode pin and a cathode pin electrically connected to the lamp bead respectively, the lamp bead is positioned in the positioning groove, the anode pin passes through the first connecting hole and is electrically connected to the anode conductive piece, and the cathode pin passes through the second connecting hole and is electrically connected to the switch assembly.

As an improvement of the present disclosure, a switch through hole is arranged on the upper sidewall, the first chamber is equipped with a limiting structure connected to the first surrounding wall group, the switch assembly includes, in sequence from top to bottom, a pushing block, a control unit block, a first conductive pin, a second conductive pin and a third conductive pin, the first conductive pin is electrically connected to the cathode conductive piece, the second conductive pin is electrically connected to the cathode pin, and the control unit block is positioned above the limiting structure, so that the pushing block is able to pass through the switch through hole.

As an improvement of the present disclosure, the limiting structure includes a first limiting vertical panel and a second limiting vertical panel connected to the first surrounding wall group respectively, and the first limiting vertical panel and the second limiting vertical panel are configured to support the control unit block, so that the pushing block is able to pass through the switch through hole.

As an improvement of the present disclosure, the limiting structure includes the first limiting vertical panel, the second limiting vertical panel and a limiting horizontal panel connected to the first surrounding wall group respectively, the first limiting vertical panel and the second limiting vertical panel are positioned below the limiting horizontal panel, and the limiting horizontal panel is configured to support the control unit block, so that the pushing block is able to pass through the switch through hole.

As an improvement of the present disclosure, the pushing block is provided with an open state and a closed state, when the pushing block is actuated to the open state, the first conductive pin is connected to the cathode conductive piece, at this time the lamp bead emits light, when the pushing block is pushed to the closed state, the first conductive pin is disconnected from the cathode conductive piece, and at this time the lamp bead does not emit light.

As an improvement of the present disclosure, the upper sidewall is provided with an opening connected to the installation chamber, and the opening is connected to a matching cover body.

As an improvement of the present disclosure, a crossed corner is formed at a junction between adjacent the sidewalls, a compartment is arranged at the crossed corner, a magnet is positioned in the compartment, the magnet is able to rotate in the compartment, and the magnet is provided with an N pole and an S pole.

As an improvement of the present disclosure, the building block main body is in the shape of a square, the first surrounding wall group includes a front sidewall, a rear sidewall, a left sidewall and a right sidewall, a right side of the front sidewall is connected to the right sidewall, an upper side of the front sidewall and an upper side of the right sidewall are respectively connected to the upper sidewall, and a lower side of the front sidewall and a lower side of the right sidewall are respectively connected to the lower sidewall; a left side of the front sidewall is connected to the left sidewall, the upper side of the front sidewall and an upper side of the left sidewall are respectively connected to the upper sidewall, and the lower side of the front sidewall and a lower side of the left sidewall are respectively connected to the lower sidewall; a right side of the rear sidewall is connected to the right sidewall, an upper side of the rear sidewall and the upper side of the right sidewall are respectively connected to the upper sidewall, and a lower side of the rear sidewall and the lower side of the right sidewall are respectively connected to the lower sidewall; a left side of the rear sidewall is connected to the left sidewall, the upper side of the rear sidewall and the upper side of the left sidewall are respectively connected to the upper sidewall, and the lower side of the rear sidewall and the lower side of the left sidewall are respectively connected to the lower sidewall.

As an improvement of the present disclosure, the crossed corner includes a first crossed corner unit arranged at a junction between the front sidewall, the right sidewall and the upper sidewall, a third crossed corner unit arranged at a junction between the front sidewall, the left sidewall and the upper sidewall, a fifth crossed corner unit arranged at a junction between the rear sidewall, the right sidewall and the upper sidewall, a seventh crossed corner unit arranged at a junction between the rear sidewall, the left sidewall and the upper sidewall, a second crossed corner unit arranged at a junction between the front sidewall, the right sidewall and the lower sidewall, a fourth crossed corner unit arranged at a junction between the front sidewall, the left sidewall and the lower sidewall, a sixth crossed corner unit arranged at a junction between the rear sidewall, the right sidewall and the lower sidewall, and an eighth crossed corner unit arranged at a junction between the rear sidewall, the left sidewall and the lower sidewall.

As an improvement of the present disclosure, the compartment includes a first compartment unit arranged at the first crossed corner unit, a third compartment unit arranged at the third crossed corner unit, a fifth compartment unit arranged at the fifth crossed corner unit, a seventh compartment unit arranged at the seventh crossed corner unit, a second compartment unit arranged at the second crossed corner unit, a fourth compartment unit arranged at the fourth crossed corner unit, a sixth compartment unit arranged at the sixth crossed corner unit, and an eighth compartment unit arranged at the eighth crossed corner unit.

As an improvement of the present disclosure, the magnet includes a first magnet unit arranged in the first compartment unit, a third magnet unit arranged in the third compartment unit, a fifth magnet unit arranged in the fifth compartment unit, a seventh magnet unit arranged in the seventh compartment unit, a second magnet unit arranged in the second compartment unit, a fourth magnet unit arranged in the fourth compartment unit, a sixth magnet unit arranged in the sixth compartment unit, and an eighth magnet unit arranged in the eighth compartment unit.

As an improvement of the present disclosure, the building block further includes a first inner enclosure wall, a second inner enclosure wall, a third inner enclosure wall and a fourth inner enclosure wall, a first stop column, a second stop column, a third stop column, and a fourth stop column; the first inner enclosure wall is connected to inner surfaces of the front sidewall, the left sidewall, the upper sidewall and the lower sidewall, and they jointly surround to form a first corner chamber, the second inner enclosure wall is connected to the inner surfaces of the front sidewall, the right sidewall, the upper sidewall and the lower sidewall, and they jointly surround to form a second corner chamber, the third inner enclosure wall is connected to the inner surfaces of the front sidewall, the left sidewall, the upper sidewall and the lower sidewall, and they jointly surround to form a third corner chamber, the fourth inner enclosure wall is connected to the inner surfaces of the front sidewall, the right sidewall, the upper sidewall and the lower sidewall, and they jointly surround to form a fourth corner chamber; the first stop column is arranged in the first corner chamber, the second stop column is arranged in the second corner chamber, the third stop column is arranged in the third corner chamber, and the fourth stop column is arranged in the fourth corner chamber; an upper side of the first stop column and the first inner enclosure wall keep the third magnet unit blocked inside the third compartment unit, and a lower side of the first stop column and the first inner enclosure wall keep the fourth magnet unit blocked inside the fourth compartment unit; an upper side of the second stop column and the second inner enclosure wall keep the first magnet unit blocked inside the first compartment unit, and a lower side of the second stop column and the second inner enclosure wall keep the second magnet unit blocked inside the second compartment unit; an upper side of the third stop column and the third inner enclosure wall keep the seventh magnet unit blocked inside the seventh compartment unit, and a lower side of the third stop column and the third inner enclosure wall keep the eighth magnet unit blocked inside the eighth compartment unit; an upper side of the fourth stop column and the fourth inner enclosure wall keep the fifth magnet unit blocked inside the fifth compartment unit, and a lower side of the fourth stop column and the fourth inner enclosure wall keep the sixth magnet unit blocked inside the sixth compartment unit.

As an improvement of the present disclosure, the upper sidewall is further provided with a hand-push groove, the switch through hole is positioned in the hand-push groove, and a height of the pushing block is lower than a height of the upper sidewall.

As an improvement of the present disclosure, the building block main body is made of a light-transmitting material.

Beneficial effects: a building block includes a building block main body and an installation housing. The building block main body is formed by a plurality of sidewalls connected to each other, the plurality of sidewalls include a first surrounding wall group, an upper sidewall and a lower sidewall connected in sequence, an upper side of the first surrounding wall group is connected to the upper sidewall, a lower side of the first surrounding wall group is connected to the lower sidewall, and a first chamber is formed by jointly surrounding the first surrounding wall group, the upper sidewall and the lower sidewall; the installation housing is connected to the upper sidewall and is positioned in the first chamber, and the installation housing is equipped with a light-emitting assembly. Through the above structure, while stacking the building block, users can turn on the light-emitting assembly inside the building block. Compared with traditional building blocks, the light-emitting building blocks greatly increase the aesthetics and fun of the building block. Moreover, the building block with lights can better stimulate users' creativity, while also increasing users' interest in building block toys, and enhance the purchasing attractiveness of building block products.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
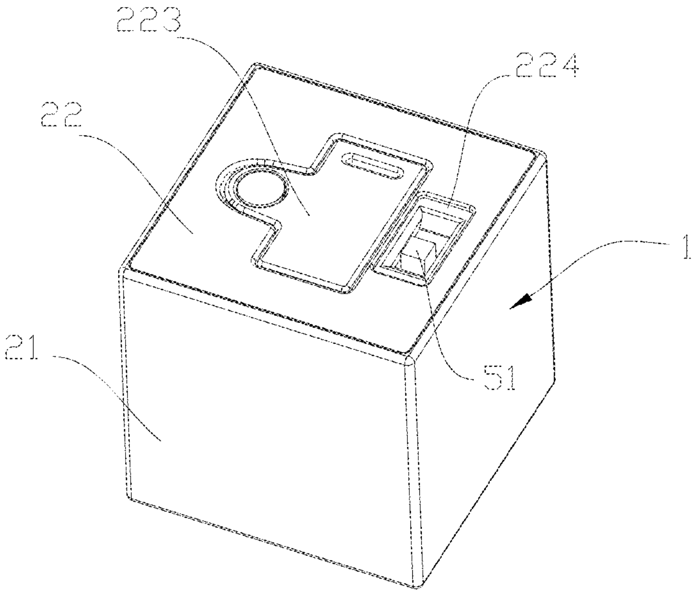
FIG. 1 is a schematic diagram of an overall structure of a building block of the present invention.
Figure 2:
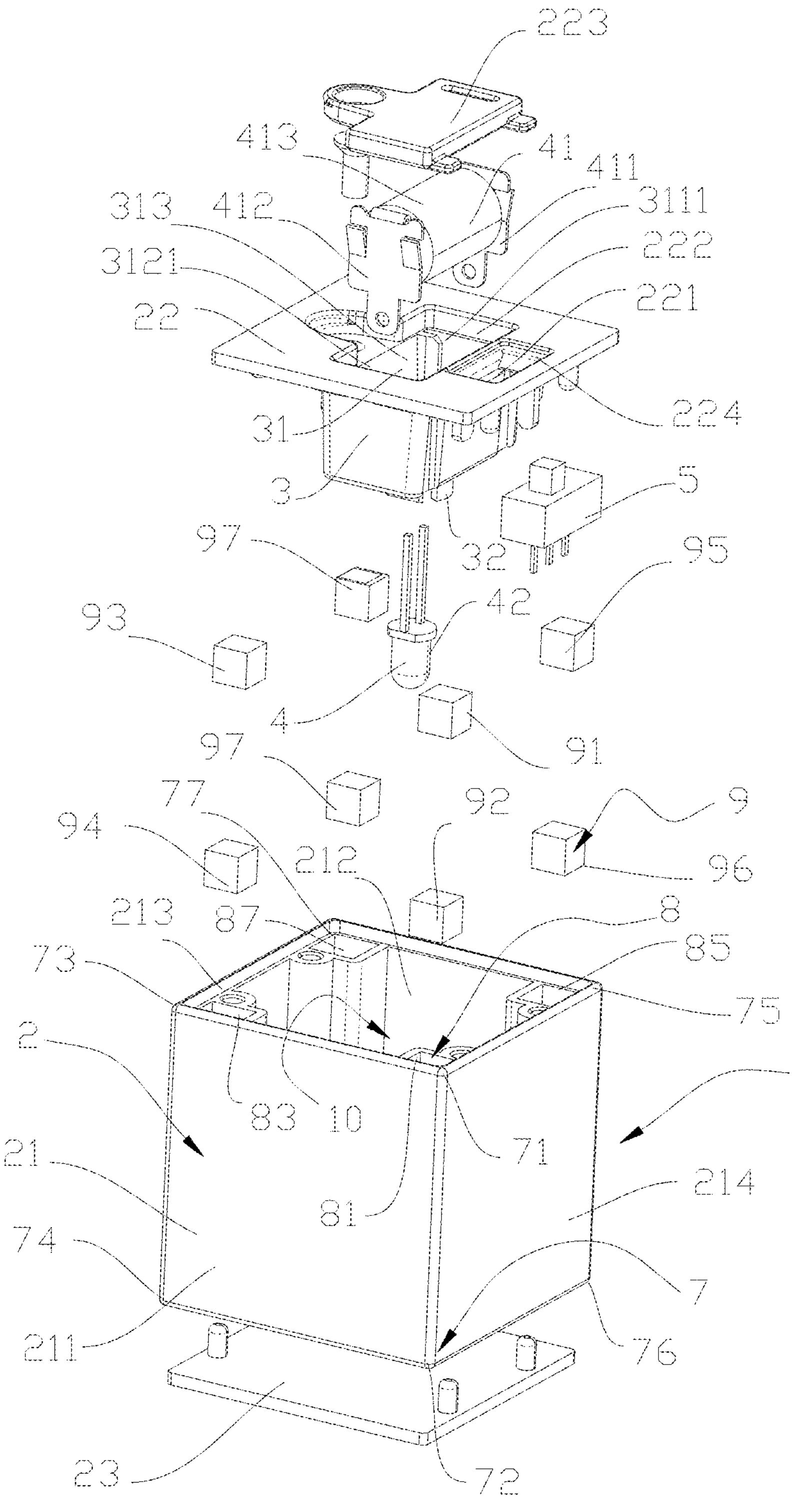
FIG. 2 is an explosion diagram of the building block of the present invention.
Figure 3:
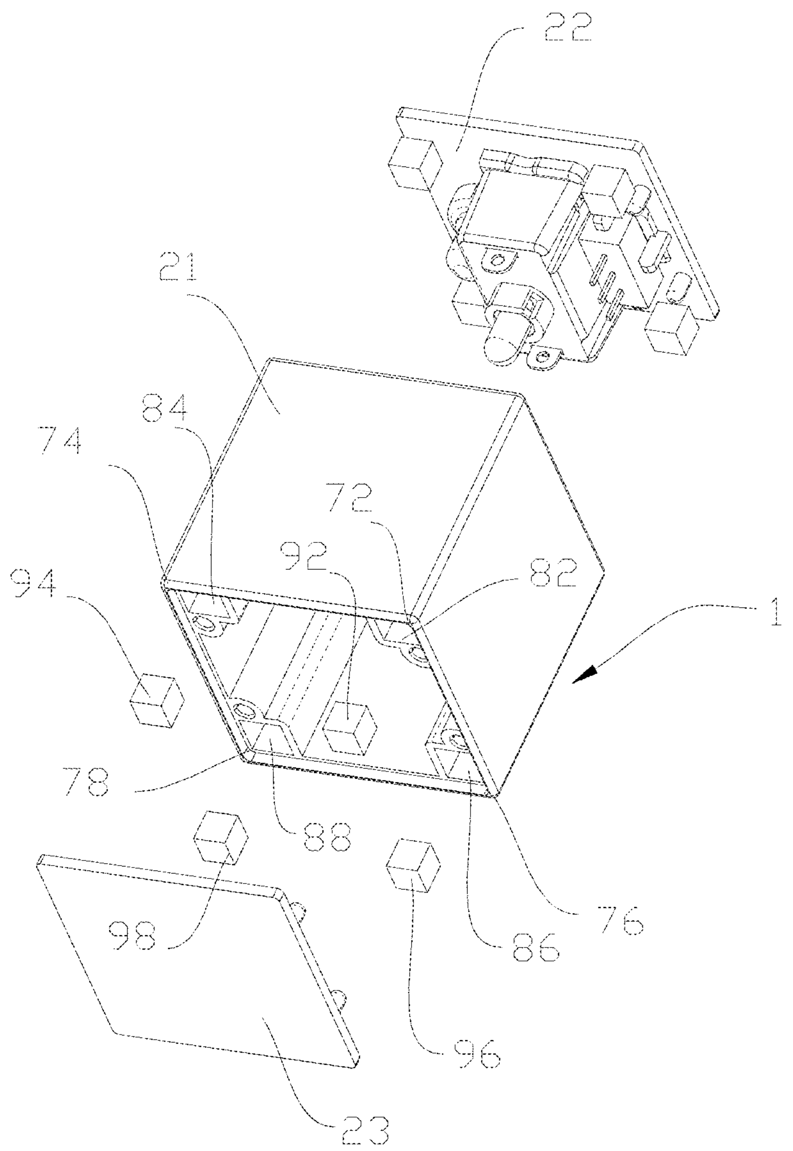
FIG. 3 is another explosion diagram of the building block of the present invention.
Figure 4:
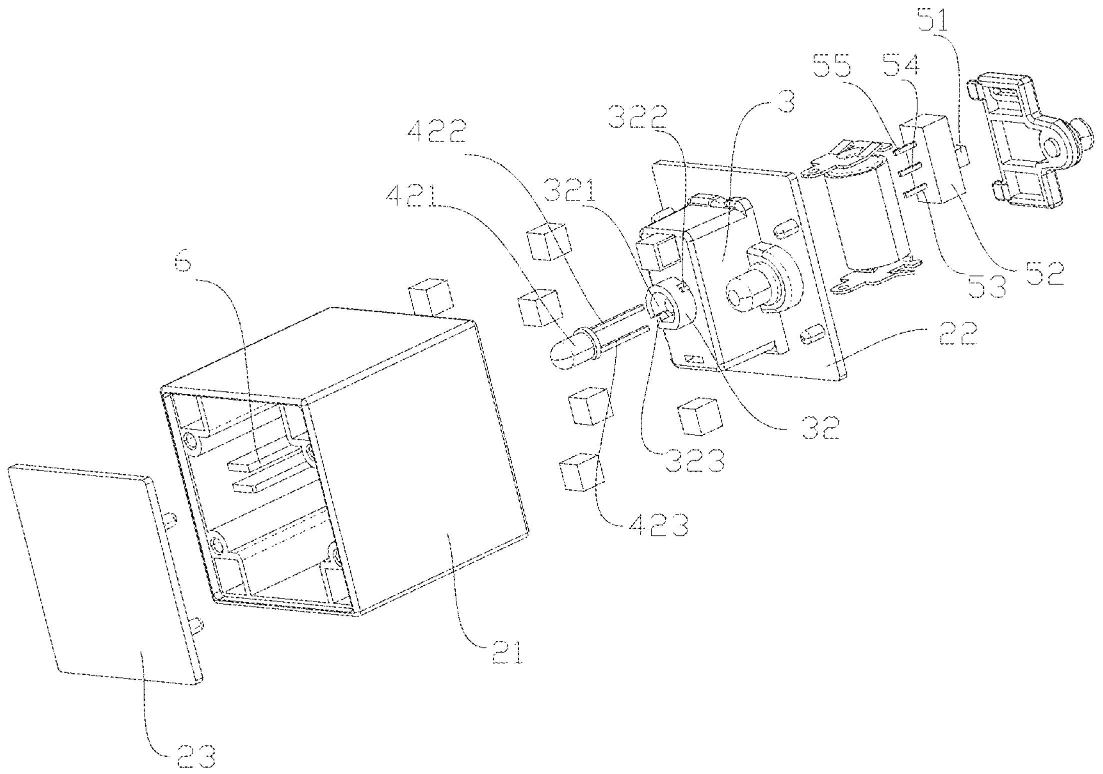
FIG. 4 is another explosion diagram of the building block of the present invention.
Figure 5:
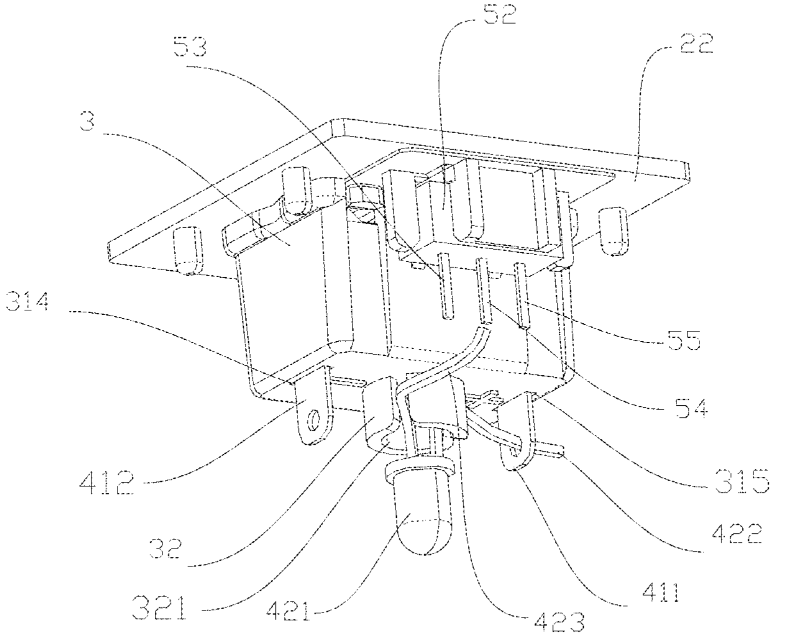
FIG. 5 is a schematic diagram of a portion of the structure of the building block of the present invention.
Figure 6:
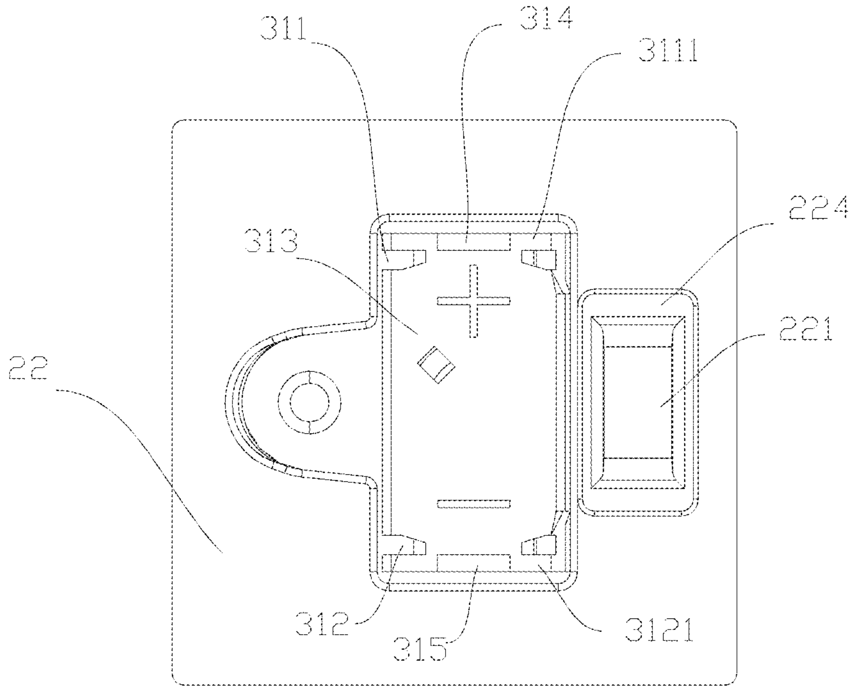
FIG. 6 is a schematic diagram of another portion of the structure of the building block of the present invention.
Figure 7:
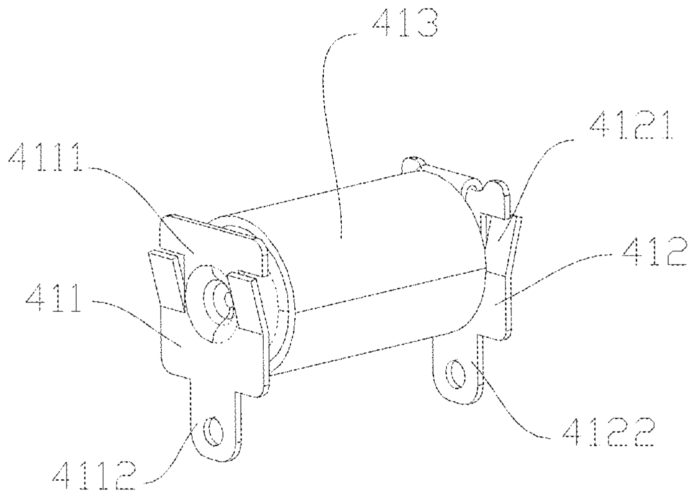
FIG. 7 is a schematic diagram of a battery assembly structure of the building block of the present invention.
Figure 8:
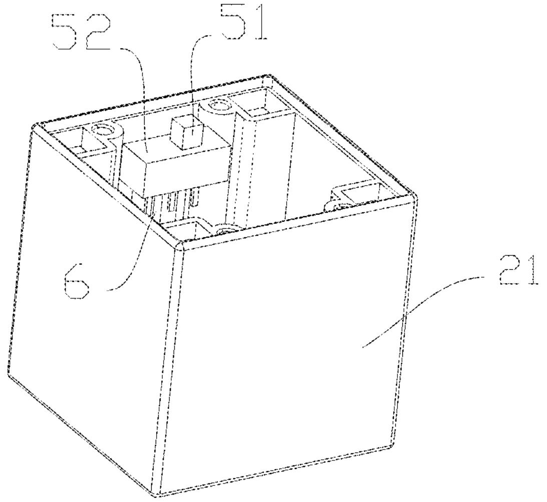
FIG. 8 is a schematic diagram of another portion of the structure of the building block of the present invention.
Figure 9:
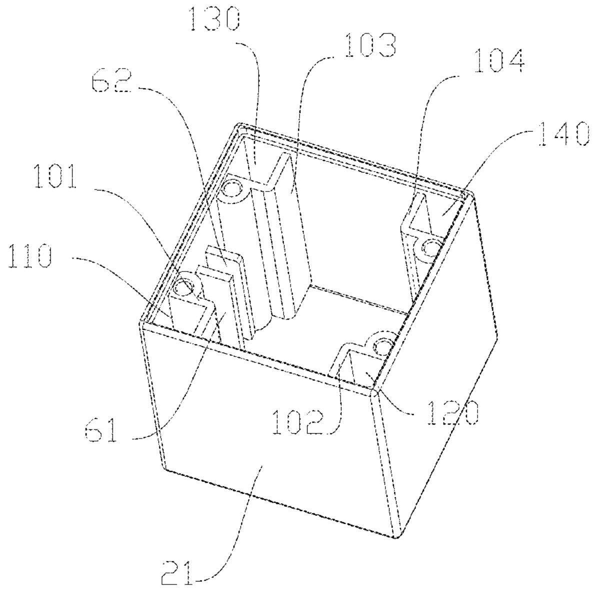
FIG. 9 is a schematic diagram of another portion of the structure of the building block of the present invention.

Referring to FIG. 1 to FIG. 14, a building block includes a building block main body 1 and an installation housing 3. The building block main body 1 is formed by a plurality of sidewalls 2 connected to each other, the plurality of sidewalls include a first surrounding wall group 21, an upper sidewall 22 and a lower sidewall 23 connected in sequence, an upper side of the first surrounding wall group 21 is connected to the upper sidewall 22, a lower side of the first surrounding wall group 21 is connected to the lower sidewall 23, and a first chamber 10 is formed by jointly surrounding the first surrounding wall group 21, the upper sidewall 22 and the lower sidewall 23; the installation housing 3 is connected to the upper sidewall 22 and is positioned in the first chamber 10, and the installation housing 3 is equipped with a light-emitting assembly 4. Through the above structure, while stacking the building block, users can turn on the light-emitting assembly 4 inside the building block. Compared with traditional building blocks, the light-emitting building blocks greatly increase the aesthetics and fun of the building block. Moreover, the building block with lights can better stimulate users' creativity, while also increasing users' interest in building block toys, and enhance the purchasing attractiveness of building block products.

In this embodiment, the light-emitting assembly 4 includes a battery assembly 41 and a light-emitting element 42 electrically connected to the battery assembly 41, and the battery assembly 41 is configured to supply power to the light-emitting element 42.

In this embodiment, the building block further includes a switch assembly 5, the switch assembly 5 is arranged on the building block main body 1 and is electrically connected to the light-emitting assembly 4, and the switch assembly 5 is configured to control turning on or turning off the light-emitting element 42.

In this embodiment, the installation housing 3 is equipped with an installation chamber 31 and a positioning clamping seat 32 arranged on an outer wall of the installation housing 3, the battery assembly 41 is positioned in the installation chamber 31, and the light-emitting element 42 is clamped in the positioning clamping seat 32 and is electrically connected to the battery assembly 41. Through the above structure, the battery assembly 41 is placed inside the installation chamber 31, and the light-emitting element 42 is connected to an outside of the installation housing 3. The design is simple and reasonable, facilitating the light emitted by the light-emitting element 42 to be presented to the maximum extent through the outer wall of the building block.

Figure 14:
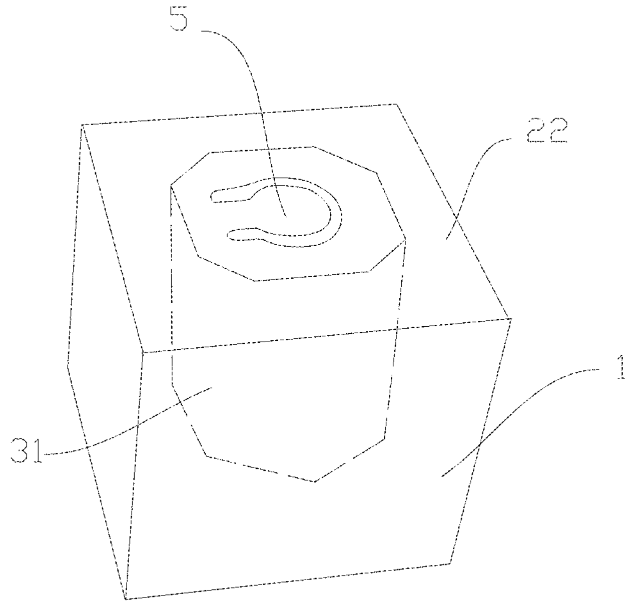
FIG. 14 is a schematic diagram of a structure of another embodiment of the building block of the present invention.

Referring to FIG. 14, in another embodiment, the battery assembly 41 and the light-emitting element 42 are able to be arranged within the installation chamber 31. Moreover, the switch assembly 5 is an elastic wall of the upper sidewall 22 of the building block. The elastic wall is positioned above an LED lamp switch. By pressing the elastic wall to press the switch, the control of turning on or turning off the LED lamp can be achieved.

In this embodiment, the installation chamber 31 is equipped with a first stop block group 311 and a second stop block group 312, the first stop block group 311 and the second stop block group 312 are respectively positioned adjacent to two opposite ends of the installation chamber 31, a first clamping groove 3111 is formed by jointly surrounding the first stop block group 311 and an inner wall of the installation chamber 31, a second clamping groove 3121 is formed by jointly surrounding the second stop block group 312 and the inner wall of the installation chamber 31, a third clamping groove 313 is formed by jointly surrounding the first stop block group 311, the second stop block group 312 and the inner wall of the installation chamber 31, and the first clamping groove 3111, the third clamping groove 313 and the second clamping groove 3121 are connected in sequence; the battery assembly 41 includes an anode conductive piece 411, a cathode conductive piece 412 and a battery 413, the anode conductive piece 411 is positioned in the first clamping groove 3111, the cathode conductive piece 412 is positioned in the second clamping groove 3121, and the battery 413 is positioned in the third clamping groove 313. Through the above structure, after the battery 413 is placed into the third clamping groove 313, each of two ends of the battery 413 can directly contact and be connected to the anode conductive piece 411 and the cathode conductive piece 412 respectively, ensuring that the battery 413 can effectively supply power to the light-emitting element 42 subsequently.

Furthermore, a first through hole 314 and a second through hole 315 are arranged on a bottom wall of the installation housing 3, the first through hole 314 is positioned in the first clamping groove 3111, the second through hole 315 is positioned in the second clamping groove 3121, the anode conductive piece 411 includes a first clamping end 4111 and a first connecting end 4112, the cathode conductive piece 412 includes a second clamping end 4121 and a second connecting end 4122, when the first clamping end 4111 is clamped in the first clamping groove 3111, the first connecting end 4112 is able to pass through the first through hole 314 and extend out from the outer wall of the installation housing 3, and when the second clamping end 4121 is clamped in the second clamping groove 3121, the second connecting end 4122 is able to pass through the second through hole 315 and extend out from the outer wall of the installation housing 3.

Furthermore, the positioning clamping seat 32 is connected to the bottom wall of the installation housing 3, the positioning clamping seat 32 is equipped with a positioning groove 321, a first connecting hole 322 and a second connecting hole 323 connected to the positioning groove 321 respectively, the light-emitting element 42 includes a lamp bead 421, an anode pin 422 and a cathode pin 423 electrically connected to the lamp bead 421 respectively, the lamp bead 421 is positioned in the positioning groove 321, the anode pin 422 passes through the first connecting hole 322 and is electrically connected to the anode conductive piece 411, and the cathode pin 423 passes through the second connecting hole 323 and is electrically connected to the switch assembly 5. Through the above structure, the design is ingenious. When the anode pin 422 of the lamp bead 421 passes through the first connecting hole 322, the lamp bead 421 can be clamped tightly onto the positioning clamping seat 32, and the electrical connection between the lamp bead 421 and the battery 413 is ensured, further providing a guarantee for the lamp bead 421 to emit light.

In this embodiment, a switch through hole 221 is arranged on the upper sidewall 22, the first chamber 10 is equipped with a limiting structure 6 connected to the first surrounding wall group 21. The switch assembly includes, in sequence from top to bottom, a pushing block 51, a control unit block 52, a first conductive pin 53, a second conductive pin 54 and a third conductive pin 55. The first conductive pin 53 is electrically connected to the cathode conductive piece 412, the second conductive pin 54 is electrically connected to the cathode pin 423, and the control unit block 52 is positioned above the limiting structure 6, so that the pushing block 51 is able to pass through the switch through hole 221. Through the above structure, due to the presence of the limiting structure 6, the pushing block 51 in the switch assembly 5 can be limited to the switch through hole 221 without falling off. This enables users to push the pushing block 51, thereby achieving the control of the light-emitting element 42.

In this embodiment, the limiting structure 6 includes a first limiting vertical panel 61 and a second limiting vertical panel 62 connected to the first surrounding wall group 21 respectively, and the first limiting vertical panel 61 and the second limiting vertical panel 62 are configured to support the control unit block 52, so that the pushing block 51 is able to pass through the switch through hole 221. Through the above structure, the design is simple and ingenious. The upper sides of the first limiting vertical panel 61 and the second limiting vertical panel 62 block the control unit block 52 of the switch assembly 5 at a specific position, enabling the pushing block 51 to pass through the switch through hole 221, and further facilitating users to push the pushing block 51 to achieve the control of the switch assembly 5 over the light-emitting lamp bead 421.

Figure 10:
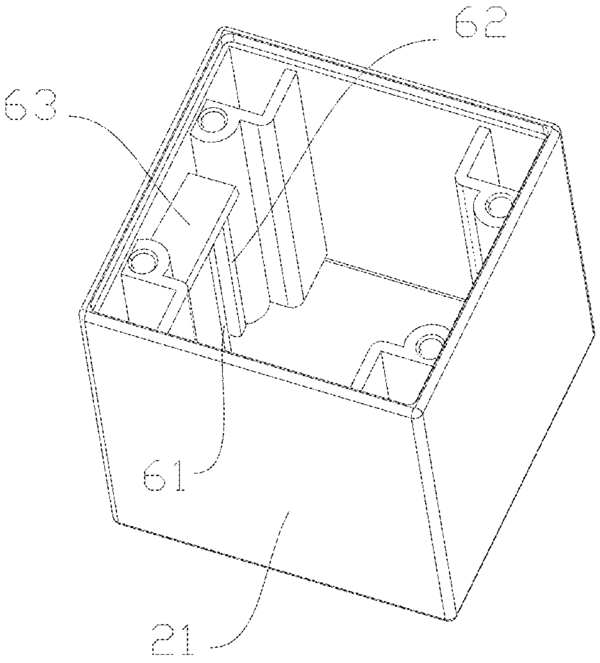
FIG. 10 is a schematic diagram of a portion of the structure of another embodiment of the building block of the present invention.
Figure 11:
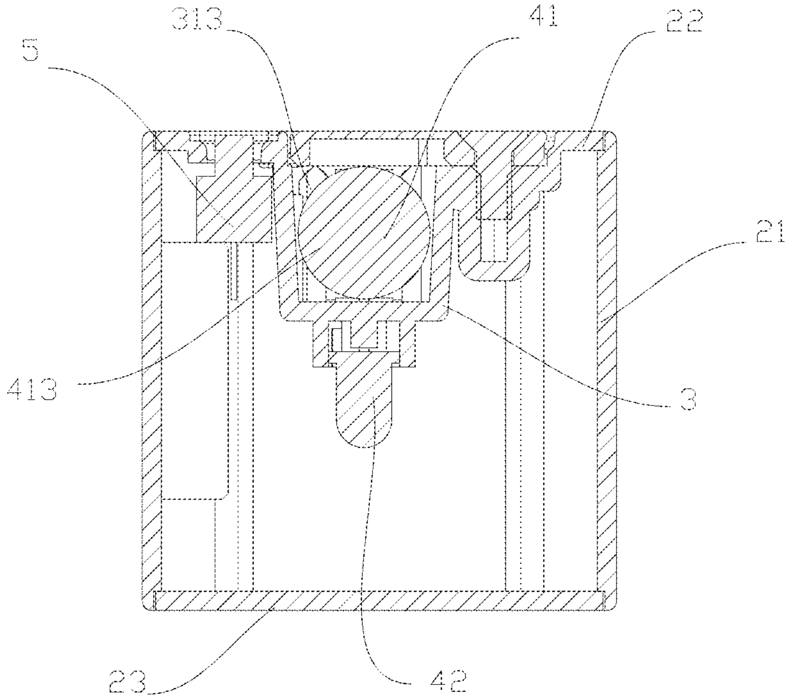
FIG. 11 is a sectional diagram cut along a switch assembly and the battery assembly of the building block of the present invention.
Figure 12:
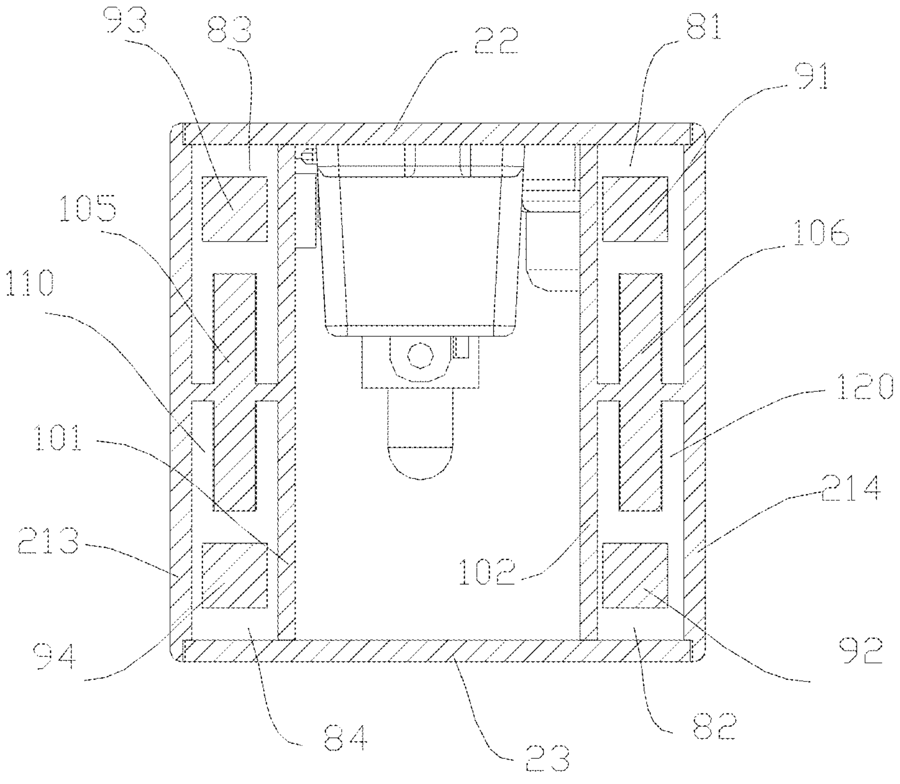
FIG. 12 is a sectional diagram cut along a first stop column and a second stop column of the building block of the present invention.
Figure 13:
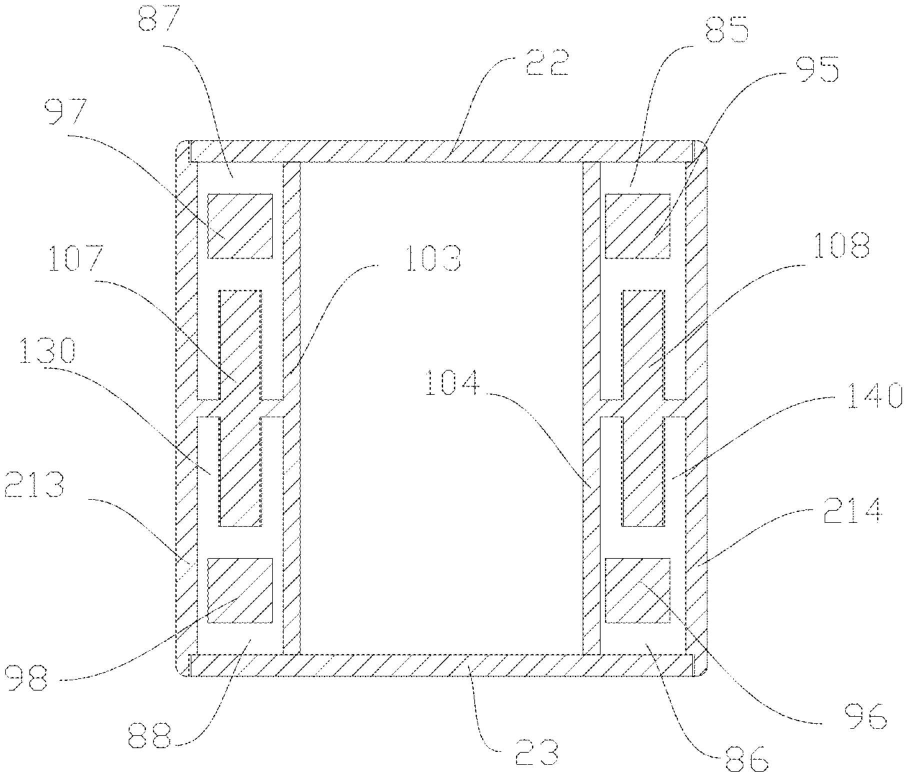
FIG. 13 is a sectional diagram cut along a third stop column and a fourth stop column of the building block of the present invention.

Referring to FIG. 10, in another embodiment, the limiting structure 6 includes the first limiting vertical panel 61, the second limiting vertical panel 62 and a limiting horizontal panel 63 connected to the first surrounding wall group 21 respectively, the first limiting vertical panel 61 and the second limiting vertical panel 62 are positioned below the limiting horizontal panel 63, and the limiting horizontal panel 63 is configured to support the control unit block 52, so that the pushing block 51 is able to pass through the switch through hole 221. Through the above structure, with the design of the limiting horizontal panel 63 and two limiting vertical panels, the structure is more solid. The control unit block 52 can be pressed firmly against the limiting horizontal panel 63, ensuring that it is not prone to misalignment or falling off when the user pushes the pushing block 51.

In this embodiment, the pushing block 51 is provided with an open state and a closed state, when the pushing block 51 is actuated to the open state, the first conductive pin 53 is connected to the cathode conductive piece 412, at this time the lamp bead 421 emits light, when the pushing block 51 is pushed to the closed state, the first conductive pin 53 is disconnected from the cathode conductive piece 412, and at this time the lamp bead 421 does not emit light. Through the above structure, the user can push the pushing block 51 until the first conductive pin 53 is electrically connected to the cathode conductive piece 412 of the battery assembly 41. At this time, the battery assembly 41 and the switch assembly 5 form a complete closed circuit, and the light-emitting lamp bead 421 can emit light. The design is simple and ingenious.

In this embodiment, the upper sidewall 22 is provided with an opening 222 connected to the installation chamber 31, and the opening 222 is connected to a matching cover body 223. Through the above structure, the design of the cover body 223 facilitates users to replace the battery 413 and the lamp bead 421, ensuring that they can be replaced in a timely manner when the battery 413 runs out of power or the lamp bead 421 is damaged.

In this embodiment, the lamp bead 421 can be an LED lamp bead 421. The LED lamp bead 421 is durable and cost-effective, which can help save manufacturing costs.

In this embodiment, the upper sidewall 22 is further provided with a hand-push groove 224, the switch through hole 221 is positioned in the hand-push groove 224, and a height of the pushing block 51 is lower than a height of the upper sidewall 22. Through the above structure, an area of the hand-push groove 224 is larger than that of the switch through hole 221, which facilitates users to push the pushing block 51 with their fingers. Moreover, the height of the pushing block 51 is lower than that of the upper sidewall 22 to avoid the protrusion of the pushing block 51 from causing unevenness of the building blocks when they are stacked, thus making it difficult to build the desired block structures.

In this embodiment, a crossed corner 7 is formed at a junction between the adjacent sidewalls 2, a compartment 8 is arranged at the crossed corner 7, a magnet 9 is positioned in the compartment 8. The magnet 9 is able to rotate in the compartment 8, and the magnet 9 is provided with an N pole and an S pole. Through the above structure, the magnetic building blocks can be mutually attracted through the first magnet 9 arranged in the first compartment 8 of the crossed corner 7, so that the magnetic building blocks can be mutually connected at the crossed corner 7 to realize the dislocation connection between the magnetic building blocks and the design and construction of a dislocation shape. Compared with the magnetic building blocks in the prior art that can only be stacked on the same axis, it greatly enriches the building methods and playing methods of the magnetic building blocks, can help children to build more shapes, and can combine the surface patterns of the magnetic building blocks to build various pattern combinations, which greatly improves children's interest in building shapes and is helpful for developing children's imagination. In addition, since the first magnet 9 can rotate in the first compartment 8 and the first magnet 9 is provided with an N pole and an S pole, when the magnetic building blocks are stacked with each other at the crossed corner 7, the first magnet 9 of the magnetic building blocks can be rotated to easily guide the N pole of the magnetic building block to be tightly adsorbed together with the S pole of another identical magnetic building block, or to guide the S pole of the magnetic building block to be tightly adsorbed with the N pole of another identical magnetic building block, so as to realize the firm connection between the magnetic building blocks, realize the dislocation connection between the magnetic building blocks, and realize the design and construction of dislocation modeling.

In this embodiment, the building block main body 1 is in the shape of a square, the first surrounding wall group 21 includes a front sidewall 211, a rear sidewall 212, a left sidewall 213 and a right sidewall 214. A right side of the front sidewall 211 is connected to the right sidewall 214, an upper side of the front sidewall 211 and an upper side of the right sidewall 214 are respectively connected to the upper sidewall 22, and a lower side of the front sidewall 211 and a lower side of the right sidewall 214 are respectively connected to the lower sidewall 23; a left side of the front sidewall 211 is connected to the left sidewall 213, the upper side of the front sidewall 211 and an upper side of the left sidewall 213 are respectively connected to the upper sidewall 22, and the lower side of the front sidewall 211 and a lower side of the left sidewall 213 are respectively connected to the lower sidewall 23; a right side of the rear sidewall 212 is connected to the right sidewall 214, an upper side of the rear sidewall 212 and the upper side of the right sidewall 214 are respectively connected to the upper sidewall 22, and a lower side of the rear sidewall 212 and the lower side of the right sidewall 214 are respectively connected to the lower sidewall 23; a left side of the rear sidewall 212 is connected to the left sidewall 213, the upper side of the rear sidewall 212 and the upper side of the left sidewall 213 are respectively connected to the upper sidewall 22, and the lower side of the rear sidewall 212 and the lower side of the left sidewall 213 are respectively connected to the lower sidewall 23.

Furthermore, a first crossed corner 7 part includes a first crossed corner unit 71 arranged at a junction between the front sidewall 211, the right sidewall 214 and the upper sidewall 22, a third crossed corner unit 73 arranged at a junction between the front sidewall 211, the left sidewall 213 and the upper sidewall 22, a fifth crossed corner unit 75 arranged at a junction between the rear sidewall 212, the right sidewall 214 and the upper sidewall 22, a seventh crossed corner unit 77 arranged at a junction between the rear sidewall 212, the left sidewall 213 and the upper sidewall 22; a second crossed corner 7 part includes a second crossed corner unit 72 arranged at a junction between the front sidewall 211, the right sidewall 214 and the lower sidewall 23, a fourth crossed corner unit 74 arranged at a junction between the front sidewall 211, the left sidewall 213 and the lower sidewall 23, a sixth crossed corner unit 76 arranged at a junction between the rear sidewall 212, the right sidewall 214 and the lower sidewall 23, and an eighth crossed corner unit 78 arranged at a junction between the rear sidewall 212, the left sidewall 213 and the lower sidewall 23.

Furthermore, a first compartment 8 part includes a first compartment unit 81 arranged at the first crossed corner unit 71, a third compartment unit 83 arranged at the third crossed corner unit 73, a fifth compartment unit 85 arranged at the fifth crossed corner unit 75, a seventh compartment unit 87 arranged at the seventh crossed corner unit 77; a second compartment 8 part includes a second compartment unit 82 arranged at the second crossed corner unit 72, a fourth compartment unit 84 arranged at the fourth crossed corner unit 74, a sixth compartment unit 86 arranged at the sixth crossed corner unit 76, and an eighth compartment unit 88 arranged at the eighth crossed corner unit 78.

Furthermore, a first magnet 9 part includes a first magnet unit 91 arranged in the first compartment unit 81, a third magnet unit 93 arranged in the third compartment unit 83, a fifth magnet unit 95 arranged in the fifth compartment unit 85, a seventh magnet unit 97 arranged in the seventh compartment unit 87; a second magnet 9 part includes a second magnet unit 92 arranged in the second compartment unit 82, a fourth magnet unit 94 arranged in the fourth compartment unit 84, a sixth magnet unit 96 arranged in the sixth compartment unit 86, and an eighth magnet unit 08 arranged in the eighth compartment unit 88.

Furthermore, the building block further includes a first inner enclosure wall 101, a second inner enclosure wall 102, a third inner enclosure wall 103 and a fourth inner enclosure wall 104, a first stop column 105, a second stop column 106, a third stop column 107, and a fourth stop column 108. The first inner enclosure wall 101 is connected to inner surfaces of the front sidewall 211, the left sidewall 213, the upper sidewall 22 and the lower sidewall 23, and they jointly surround to form a first corner chamber 110. The second inner enclosure wall 102 is connected to the inner surfaces of the front sidewall 211, the right sidewall 214, the upper sidewall 22 and the lower sidewall 23, and they jointly surround to form a second corner chamber 120. The third inner enclosure wall 103 is connected to the inner surfaces of the front sidewall 211, the left sidewall 213, the upper sidewall 22 and the lower sidewall 23, and they jointly surround to form a third corner chamber 130. The fourth inner enclosure wall 104 is connected to the inner surfaces of the front sidewall 211, the right sidewall 214, the upper sidewall 22 and the lower sidewall 23, and they jointly surround to form a fourth corner chamber 140. The first stop column 105 is arranged in the first corner chamber 110, the second stop column 106 is arranged in the second corner chamber 120, the third stop column 107 is arranged in the third corner chamber 130, and the fourth stop column 108 is arranged in the fourth corner chamber 140; an upper side of the first stop column 105 and the first inner enclosure wall 101 keep the third magnet unit 93 blocked inside the third compartment unit 83, and a lower side of the first stop column 105 and the first inner enclosure wall 101 keep the fourth magnet unit 94 blocked inside the fourth compartment unit 84; an upper side of the second stop column 106 and the second inner enclosure wall 102 keep the first magnet unit 91 blocked inside the first compartment unit 81, and a lower side of the second stop column 106 and the second inner enclosure wall 102 keep the second magnet unit 92 blocked inside the second compartment unit 82; an upper side of the third stop column 107 and the third inner enclosure wall 103 keep the seventh magnet unit 97 blocked inside the seventh compartment unit 87, and a lower side of the third stop column 107 and the third inner enclosure wall 103 keep the eighth magnet unit 98 blocked inside the eighth compartment unit 88; an upper side of the fourth stop column 108 and the fourth inner enclosure wall 104 keep the fifth magnet unit 95 blocked inside the fifth compartment unit 85, and a lower side of the fourth stop column 108 and the fourth inner enclosure wall 104 keep the sixth magnet unit 96 blocked inside the sixth compartment unit 86.

Through the above structure, it has a rational design and an uncomplicated structure. Moreover, the connection is stable. By arranging the first magnet 9 in the first corner unit, the second corner unit, the third corner unit, the fourth corner unit, the fifth corner unit, the sixth corner unit, the seventh corner unit and the eighth corner unit of the square building block, the magnetic building blocks can be reciprocally and staggeredly connected and stacked at the corners of each sidewall 2, which enables the realization of the design and construction of dislocation modeling.

In this embodiment, the building block main body 1 is made of a light-transmitting material. Through the above structure, the building block main body 1 made of light-transmitting material can transmit the light emitted by the light-emitting element 42, and make its appearance more aesthetically pleasing.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

What is claimed is:

1. A building block, comprising:

a building block main body, wherein the building block main body is made of a light-transmitting material, and formed by a plurality of sidewalls connected to each other, the plurality of sidewalls comprise a first surrounding wall group, an upper sidewall and a lower sidewall connected in sequence, an upper side of the first surrounding wall group is connected to the upper sidewall, a lower side of the first surrounding wall group is connected to the lower sidewall, and a first chamber is formed by jointly surrounding the first surrounding wall group, the upper sidewall and the lower sidewall; and an installation housing, wherein the installation housing is connected to the upper sidewall and is positioned in the first chamber, and the installation housing is equipped with a positioning clamping seat connected to a bottom wall of the installation housing away from upper sidewall, the positioning clamping seat is equipped with a positioning groove, and a light-emitting assembly is positioned in the positioning groove and faces towards a central hollow space of the first chamber, wherein the building block further comprises a switch assembly, the switch assembly is arranged on the building block main body and is electrically connected to the light-emitting assembly, and the switch assembly is configured to control turning on or turning off the light-emitting element;

wherein the installation housing is further equipped with an installation chamber, and a battery assembly is positioned in the installation chamber, and the light-emitting element is electrically connected to the battery assembly;

wherein the installation chamber is equipped with a first stop block group and a second stop block group, the first stop block group and the second stop block group are respectively positioned adjacent to two opposite ends of the installation chamber, a first clamping groove is formed by jointly surrounding the first stop block group and an inner wall of the installation chamber, a second clamping groove is formed by jointly surrounding the second stop block group and the inner wall of the installation chamber, a third clamping groove is formed by jointly surrounding the first stop block group, the second stop block group and the inner wall of the installation chamber, and the first clamping groove, the third clamping groove and the second clamping groove are connected in sequence; the battery assembly comprises an anode conductive piece, a cathode conductive piece and a battery, the anode conductive piece is positioned in the first clamping groove, the cathode conductive piece is positioned in the second clamping groove, and the battery is positioned in the third clamping groove;

wherein a first through hole and a second through hole are arranged on a bottom wall of the installation housing, the first through hole is positioned in the first clamping groove, the second through hole is positioned in the second clamping groove, the anode conductive piece comprises a first clamping end and a first connecting end, the cathode conductive piece comprises a second clamping end and a second connecting end, when the first clamping end is clamped in the first clamping groove, the first connecting end is able to pass through the first through hole and extend out from the outer wall of the installation housing, and when the second clamping end is clamped in the second clamping groove, the second connecting end is able to pass through the second through hole and extend out from the outer wall of the installation housing;

wherein the positioning clamping seat is further equipped with a first connecting hole and a second connecting hole connected to the positioning groove respectively, the light-emitting element comprises a lamp bead, an anode pin and a cathode pin electrically connected to the lamp bead respectively, the lamp bead is positioned in the positioning groove, the anode pin passes through the first connecting hole and is electrically connected to the anode conductive piece, and the cathode pin passes through the second connecting hole and is electrically connected to the switch assembly.

2. The building block according to claim 1, wherein a switch through hole is arranged on the upper sidewall, the first chamber is equipped with a limiting structure connected to the first surrounding wall group, the switch assembly comprises, in sequence from top to bottom, a pushing block, a control unit block, a first conductive pin, a second conductive pin and a third conductive pin, the first conductive pin is electrically connected to the cathode conductive piece, the second conductive pin is electrically connected to the cathode pin, and the control unit block is positioned above the limiting structure, so that the pushing block is able to pass through the switch through hole.

3. The building block according to claim 2, wherein the limiting structure comprises a first limiting vertical panel and a second limiting vertical panel connected to the first surrounding wall group respectively, and the first limiting vertical panel and the second limiting vertical panel are configured to support the control unit block, so that the pushing block is able to pass through the switch through hole.

4. The building block according to claim 2, wherein the limiting structure comprises the first limiting vertical panel, the second limiting vertical panel and a limiting horizontal panel connected to the first surrounding wall group respectively, the first limiting vertical panel and the second limiting vertical panel are positioned below the limiting horizontal panel, and the limiting horizontal panel is configured to support the control unit block, so that the pushing block is able to pass through the switch through hole.

5. The building block according to claim 2, wherein the pushing block is provided with an open state and a closed state, when the pushing block is actuated to the open state, the first conductive pin is connected to the cathode conductive piece, at this time the lamp bead emits light, when the pushing block is pushed to the closed state, the first conductive pin is disconnected from the cathode conductive piece, and at this time the lamp bead does not emit light.

6. The building block according to claim 2, wherein the upper sidewall is further provided with a hand-push groove, the switch through hole is positioned in the hand-push groove, and a height of the pushing block is lower than a height of the upper sidewall.

7. The building block according to claim 1, wherein the upper sidewall is provided with an opening connected to the installation chamber, and the opening is connected to a matching cover body.

8. The building block according to claim 1, wherein a crossed corner is formed at a junction between adjacent the sidewalls, a compartment is arranged at the crossed corner, a magnet is positioned in the compartment, the magnet is able to rotate in the compartment, and the magnet is provided with an N pole and an S pole.

9. The building block according to claim 8, wherein the building block main body is in the shape of a square, the first surrounding wall group comprises a front sidewall, a rear sidewall, a left sidewall and a right sidewall, a right side of the front sidewall is connected to the right sidewall, an upper side of the front sidewall and an upper side of the right sidewall are respectively connected to the upper sidewall, and a lower side of the front sidewall and a lower side of the right sidewall are respectively connected to the lower sidewall; a left side of the front sidewall is connected to the left sidewall, the upper side of the front sidewall and an upper side of the left sidewall are respectively connected to the upper sidewall, and the lower side of the front sidewall and a lower side of the left sidewall are respectively connected to the lower sidewall; a right side of the rear sidewall is connected to the right sidewall, an upper side of the rear sidewall and the upper side of the right sidewall are respectively connected to the upper sidewall, and a lower side of the rear sidewall and the lower side of the right sidewall are respectively connected to the lower sidewall; a left side of the rear sidewall is connected to the left sidewall, the upper side of the rear sidewall and the upper side of the left sidewall are respectively connected to the upper sidewall, and the lower side of the rear sidewall and the lower side of the left sidewall are respectively connected to the lower sidewall.

10. The building block according to claim 9, wherein the crossed corner comprises a first crossed corner unit arranged at a junction between the front sidewall, the right sidewall and the upper sidewall, a third crossed corner unit arranged at a junction between the front sidewall, the left sidewall and the upper sidewall, a fifth crossed corner unit arranged at a junction between the rear sidewall, the right sidewall and the upper sidewall, a seventh crossed corner unit arranged at a junction between the rear sidewall, the left sidewall and the upper sidewall, a second crossed corner unit arranged at a junction between the front sidewall, the right sidewall and the lower sidewall, a fourth crossed corner unit arranged at a junction between the front sidewall, the left sidewall and the lower sidewall, a sixth crossed corner unit arranged at a junction between the rear sidewall, the right sidewall and the lower sidewall, and an eighth crossed corner unit arranged at a junction between the rear sidewall, the left sidewall and the lower sidewall.

11. The building block according to claim 10, wherein the compartment comprises a first compartment unit arranged at the first crossed corner unit, a third compartment unit arranged at the third crossed corner unit, a fifth compartment unit arranged at the fifth crossed corner unit, a seventh compartment unit arranged at the seventh crossed corner unit, a second compartment unit arranged at the second crossed corner unit, a fourth compartment unit arranged at the fourth crossed corner unit, a sixth compartment unit arranged at the sixth crossed corner unit, and an eighth compartment unit arranged at the eighth crossed corner unit.

12. The building block according to claim 11, wherein the magnet comprises a first magnet unit arranged in the first compartment unit, a third magnet unit arranged in the third compartment unit, a fifth magnet unit arranged in the fifth compartment unit, a seventh magnet unit arranged in the seventh compartment unit, a second magnet unit arranged in the second compartment unit, a fourth magnet unit arranged in the fourth compartment unit, a sixth magnet unit arranged in the sixth compartment unit, and an eighth magnet unit arranged in the eighth compartment unit.

13. The building block according to claim 12, wherein the building block further comprises a first inner enclosure wall, a second inner enclosure wall, a third inner enclosure wall and a fourth inner enclosure wall, a first stop column, a second stop column, a third stop column, and a fourth stop column; the first inner enclosure wall is connected to inner surfaces of the front sidewall, the left sidewall, the upper sidewall and the lower sidewall, and they jointly surround to form a first corner chamber, the second inner enclosure wall is connected to the inner surfaces of the front sidewall, the right sidewall, the upper sidewall and the lower sidewall, and they jointly surround to form a second corner chamber, the third inner enclosure wall is connected to the inner surfaces of the front sidewall, the left sidewall, the upper sidewall and the lower sidewall, and they jointly surround to form a third corner chamber, the fourth inner enclosure wall is connected to the inner surfaces of the front sidewall, the right sidewall, the upper sidewall and the lower sidewall, and they jointly surround to form a fourth corner chamber; the first stop column is arranged in the first corner chamber, the second stop column is arranged in the second corner chamber, the third stop column is arranged in the third corner chamber, and the fourth stop column is arranged in the fourth corner chamber; an upper side of the first stop column and the first inner enclosure wall keep the third magnet unit blocked inside the third compartment unit, and a lower side of the first stop column and the first inner enclosure wall keep the fourth magnet unit blocked inside the fourth compartment unit; an upper side of the second stop column and the second inner enclosure wall keep the first magnet unit blocked inside the first compartment unit, and a lower side of the second stop column and the second inner enclosure wall keep the second magnet unit blocked inside the second compartment unit; an upper side of the third stop column and the third inner enclosure wall keep the seventh magnet unit blocked inside the seventh compartment unit, and a lower side of the third stop column and the third inner enclosure wall keep the eighth magnet unit blocked inside the eighth compartment unit; an upper side of the fourth stop column and the fourth inner enclosure wall keep the fifth magnet unit blocked inside the fifth compartment unit, and a lower side of the fourth stop column and the fourth inner enclosure wall keep the sixth magnet unit blocked inside the sixth compartment unit.

* * * * *